(12) United States Patent
Kuhn-Matysiak (10) Patent No.: US 11,961,379 B2
(45) Date of Patent: Apr. 16, 2024

(54) MEASUREMENT CHAMBER FOR MOUNTING ON A SMOKE DETECTION UNIT, HAVING A LIGHT TRAP ACCORDING TO THE PRINCIPLE OF A FRESNEL STEPPED LENS

(71) Applicant: Siemens Schweiz AG, Zurich (CH)

(72) Inventor: Ulrich Kuhn-Matysiak, Staufen (DE)

(73) Assignee: SIEMENS SCHWEIZ AG, Zurich (CH)

(*) Notice: Subject to any disclaimer, the term of this patent is extended or adjusted under 35 U.S.C. 154(b) by 74 days.

(21) Appl. No.: 17/787,449

(22) PCT Filed: Nov. 13, 2020

(86) PCT No.: PCT/EP2020/082157
§ 371 (c)(1),
(2) Date: Jun. 20, 2022

(87) PCT Pub. No.: WO2021/121815
PCT Pub. Date: Jun. 24, 2021

(65) Prior Publication Data
US 2023/0028148 A1 Jan. 26, 2023

(30) Foreign Application Priority Data
Dec. 20, 2019 (EP) .................................... 19218628

(51) Int. Cl.
*G08B 17/107* (2006.01)
*G01N 21/53* (2006.01)
*G08B 17/113* (2006.01)

(52) U.S. Cl.
CPC ........... *G08B 17/107* (2013.01); *G01N 21/53* (2013.01); *G08B 17/113* (2013.01)

(58) Field of Classification Search
CPC ..... G08B 17/107; G08B 17/113; G01N 21/53
(Continued)

(56) References Cited

U.S. PATENT DOCUMENTS 4,672,206 A * 6/1987 Suzuki .................. G08B 13/193
250/353
5,451,931 A * 9/1995 Muller .................. G08B 17/113
340/630
(Continued)

FOREIGN PATENT DOCUMENTS

DE 602 01 208 9/2005
EP 0 135 361 3/1985
(Continued)

OTHER PUBLICATIONS

Search Report for International Application No. PCT/EP2020/082157, 13 pages, dated Mar. 1, 2021.

*Primary Examiner* — Kerri L McNally
(74) *Attorney, Agent, or Firm* — Slayden Grubert Beard PLLC (57) ABSTRACT

Various embodiments of the teachings herein include a measurement chamber for a smoke detection unit of a smoke detector. The measurement chamber may include: at least a passage for smoke to be detected; and a measurement chamber cover with angular light trap structures on an inside of the measurement chamber. The angular light trap structures are shaped to follow the compact-design principle of a Fresnel stepped lens.

12 Claims, 5 Drawing Sheets

(58) Field of Classification Search
USPC .......................................................... 340/628
See application file for complete search history.

(56) References Cited

U.S. PATENT DOCUMENTS

| | | | | |
|---|---|---|---|---|
| 9,196,141 | B1* | 11/2015 | Schmidt | G08B 21/14 |
| 2002/0154018 | A1 | 10/2002 | Nishikawa | 340/630 |
| 2009/0016058 | A1* | 1/2009 | Schulz | F21S 8/00 |
| | | | | 362/268 |
| 2009/0237259 | A1 | 9/2009 | Yokota | 340/628 |
| 2018/0061215 | A1* | 3/2018 | Vollenweider | G08B 17/117 |

FOREIGN PATENT DOCUMENTS

| | | |
|---|---|---|
| EP | 3 182 391 | 6/2017 |
| EP | 3 319 057 | 5/2018 |
| EP | 3 499 475 | 6/2019 |

* cited by examiner

MEASUREMENT CHAMBER FOR MOUNTING ON A SMOKE DETECTION UNIT, HAVING A LIGHT TRAP ACCORDING TO THE PRINCIPLE OF A FRESNEL STEPPED LENS

CROSS-REFERENCE TO RELATED APPLICATIONS

This application is a U.S. National Stage Application of International Application No. PCT/EP2020/082157 filed Nov. 13, 2020, which designates the United States of America, and claims priority to EP Application No. 19218628.6 filed Dec. 20, 2019, the contents of which are hereby incorporated by reference in their entirety.

TECHNICAL FIELD

The present disclosure relates to smoke detectors. Various embodiments of the teachings herein may include measurement chambers for attachment to or above a smoke detection unit of a smoke alarm.

BACKGROUND

Measurement chambers for smoke detectors may have the shape of a pot, cup, hood, or cap. Typically, they are permeable for smoke to be detected. The measurement chamber may provide shielding from direct ambient light. They also includes a measurement chamber cover with light-absorbing, angular structures on an inside of the measurement chamber. The use of such measurement chambers in smoke alarms is generally known. They are also referred to as optical measurement chambers or also as a labyrinth.

Smoke detection units which are integrated into optoelectronic components as a System-on-a-Chip (SoC) are known from EP 3 499 475 A2 and from EP 3 319 057 A1. The smoke detection unit designed as an SMD component in EP 3 499 475 A2 comprises an infrared LED, a blue-glowing LED, and a photodiode, which is spectrally matched to it. When the smoke detection unit is installed, the optical axes of the LEDs run transversely, i.e. almost orthogonally, to the circuit board. The optical axis of the photodiode runs orthogonally to the circuit board. In addition, a measurement chamber for application to a circuit carrier is described, which comprises such an integrated smoke detection unit. The measurement chamber is permeable to the smoke to be detected, but is shielded from direct ambient light.

The problem that arises here is that the extreme backward scattered light arrangement of 2pprox . . . 160° scatters and/or reflects a not inconsiderable part of the light emitted by the two LEDs in the direction of the measurement chamber opposite to them as a so-called basic pulse back to the photosensor or the photodiode. If such a measurement chamber has an assumed diameter of 25 mm with an overall height of 15 mm, the received light intensity level of the reflected basic pulse exceeds the alarm level for the fire situation many times over. Reliable smoke detection is therefore not possible at all.

A further reduction of the basic pulse is possible, for example by means of a cone known from US 2009/237259 A1, which is embodied on the inside of the measurement chamber and which deflects the beam of light laterally.

SUMMARY

On this basis, the teachings of the present disclosure may include improved measurement chambers for a smoke detection unit. In particular, the teachings may provide a measurement chamber in which the influence of the basic pulse is reduced. For example, some embodiments may include a measurement chamber for attachment to a smoke detection unit of a smoke detector (10), wherein the measurement chamber (M) is permeable for smoke to be detected and comprises a measurement chamber cover (D) with angular light trap structures (AB) on an inside of the measurement chamber (M), characterized in that the angular, sharp-edged, light trap structures (FL) are shaped in such a way that they follow the compact-design principle of a Fresnel stepped lens (FLI).

In some embodiments, the (Fresnel) light trap structures (FL), analogous to a focal point (BP) of a Fresnel lens (FLI), have a Fresnel axis (FA) and are aligned on a common Fresnel point (FP), wherein the Fresnel point (FP) lies in a floor plane (BO) of the measurement chamber (M) opposite the measurement chamber cover (D) or at a small distance (AF) from the measurement chamber cover (D).

In some embodiments, the Fresnel Light trap structures (FL) are aligned in such a way that the Fresnel point (FP), after the measurement chamber (M) has been attached to a smoke detection unit provided, is located at least approximately at the light exit of a light emitter (2) of the smoke detection unit.

In some embodiments, the Fresnel light trap structures (LF) are formed by a plurality of notches or grooves arranged concentrically to the Fresnel axis (FA), or by a notch or groove running helically in relation to the Fresnel axis (FA).

In some embodiments, the measurement chamber cover (D) has a measurement chamber cover plane (DE) running parallel to the floor plane (BO) of the measurement chamber (M), wherein the concentrically arranged notches (FL) or grooves, or the spiral-shaped notch (FL) or groove in the measurement chamber cover (D) have a respective inner edge (IK) and a respective outer edge (AK) projecting away from the measurement chamber cover (D), and wherein a respective outer edge (AK) in relation to a radially inwardly adjoining inner edge (IK) is offset radially in such a way to the outside that a flank formed between the two edges (AK, IK) runs orthogonally to the measurement chamber cover plane (DE).

In some embodiments, the measurement chamber (M) has an axis of rotation or rotational symmetry axis (A) running orthogonally to the ground plane (BO) and wherein the Fresnel light trap structures (LF) are aligned in such a way that the Fresnel axis (FA) runs parallel, preferably aligned with the axis of rotation or rotational symmetry axis (A) of the measurement chamber (M).

In some embodiments, the Fresnel light trap structures (FL) are aligned in such a way that the Fresnel axis (FA) aligns at least approximately with an optical transmission axis (SA) of the light emitter (2) of the smoke detection unit.

In some embodiments, the Fresnel light trap structures (FL) are linear, straight light trap structures and are shaped in such a way that, after the measurement chamber (M) has been attached to a smoke detection unit provided, they are optically aligned with a straight line which is at least approximately through an optical transmission axis (SA) at the light exit point of a light emitter (2) of the smoke detection unit and preferably at least approximately through a receiving axis (EA) of a photosensor (3) of the smoke detection unit, and wherein this straight line in a floor plane (BO) lies opposite to the measurement chamber cover (D) of the measurement chamber (M) or at a short distance (AF) from the floor plane (BO) towards the measurement chamber cover (D).

In some embodiments, the measurement chamber (M) has lamellae (LA) permeable to smoke and shielding from direct ambient light and wherein the lamellae (LA) are arranged along the circumference of the measurement chamber (M).

In some embodiments, the Fresnel light trap structures (FL) have a structure depth (T) in a range from 1 mm to 10 mm, in particular in a range from 1.5 mm to 5 mm, preferably in a range of 2 mm to 3 mm.

As another example, some embodiments include a method for producing a cylindrical measurement chamber (M) for a smoke detection unit of a smoke detector (10), wherein a measurement chamber cover (D) is first created and this is combined with a complementary, essentially hollow or hollow cylindrical smoke inlet part (MO), to make up the measurement chamber (M) as a whole, wherein the measurement chamber cover (D) is produced by means of an injection molding process (STP, MAT) as a spherical component (FLO) with introduced angular, sharp-edged concentric light trap structures, which are shaped in such a way that they are Fresnel light trap structures (FL) following the compact-design principle of a Fresnel stepped lens (FLI), wherein the Fresnel light trap structures (FL) of the spherical measurement chamber cover (FLO), after the injection molding process (STP, MAT), are free of undercuts (UC), and wherein the spherical measurement chamber cover (FLO) by means of a deformation process (BLA), in particular by means of a blow molding process, is formed into an essentially flat measurement chamber cover (FLM), wherein the Fresnel light trap structures (FL) are shaped in the direction of the Fresnel axis (A) and undercuts (UC) now form, wherein the Fresnel point (FP), after the measurement chamber (M) as a whole has been produced and after it has been attached to a smoke detection unit provided, may be located at the light exit of a light emitter (2) of the smoke detection unit.

As another example, some embodiments include a smoke detection module (1), with a smoke detection unit comprising at least one light emitter (2) arranged on a circuit carrier (4) and at least one spectrally matched photosensor (3) in a scattered light arrangement in each case, and with a measurement chamber (M) or with a measurement chamber (M) produced as described herein, wherein the measurement chamber (M) is attached to the smoke detection unit.

In some embodiments, the measurement chamber (M) has an axis of rotation (A) or a rotational symmetry axis (A), wherein the measurement chamber (M) is positioned on the circuit carrier (4) such that the rotational or rotational symmetry axis (A) of the measurement chamber (M), or the Fresnel axis (FA) of the Fresnel light trap structures (FL) is at least approximately aligned with an optical transmission axis (SA) of the light emitter (2) of the smoke detection unit.

In some embodiments, a diaphragm to limit the respective emitted light beam (LK) is located optically downstream of the at least one light emitter (2), wherein a further diaphragm to limit the respective optical reception area (FOV) is connected optically upstream of the at least one photosensor (3), and the optical limits are dimensioned in such a way that only a proportion of the area of the part of the measurement chamber cover (D) illuminated by the respective light emitter (2) is in a range of 10% to 40%, in a range of 10 to 20%, in the respective optical detection range (FOV) of the at least one photosensor (3).

As another example, some embodiments include a smoke detector, in particular a scattered light smoke detector, with a detector housing (G) and with a smoke detection module (1) as described herein accommodated in the detector housing (G), wherein the detector housing (G) has one or more smoke inlet openings (OF) for the passage of ambient air into the interior of the detector housing (G) and further into the measurement chamber (M) of the smoke detection module (1).

As another example, some embodiments include a smoke detector, in particular a scattered light smoke detector, with a detector housing (G) and with a smoke detection module (1) as described herein accommodated in the detector housing (G), wherein the measurement chamber (M) of the smoke detection module (1) is an integral part of the detector housing (G) and wherein the detector housing (G) has one or more smoke inlet openings (OF) embodied as lamellae (LA), permeable to smoke to be detected and shielding from direct ambient light.

BRIEF DESCRIPTION OF THE DRAWINGS

The teachings and some example embodiments of the present disclosure are evident from the example of the following figures. In the figures.

DETAILED DESCRIPTION

In some embodiments of the teachings herein, the angular, e.g., sharp-edged, light trap structures are shaped in such a way that they follow the compact-design principle of a Fresnel stepped lens. In other words, these light-absorbing structures are a compact-design form of a single light trap funnel analogous to the principle of a Fresnel step lens. In other words, the light trap structures are shaped in such a way that they are optically aligned to or approximately to a common point. If the measurement chamber is properly attached to a smoke detection unit provided for this purpose this point is then ideally at the light emitter or at the light exit point of this smoke detection unit.

In some embodiments, the light trap structures can be shaped in such a way that they are optically aligned on or approximately on a straight line, which runs through the transmission axis directly on the light emitter and preferably through the reception axis directly on the photosensor. The light trap structures can also be referred to as Fresnel light trap structures. These may be linear, circular, elliptical, or straight light trap structures.

"Optical alignment" of the Fresnel light trap structures means that the bisector of the opening angle of a respective light trap structure runs through the common point as the "focal point" or intersects the aforementioned straight line. The bisector runs perpendicular to the tangent, which runs along the longitudinal extent of the respective light trap structure along its inner edge or along its apex.

The teachings of the present disclosure may be used to reduce the design of an "ideal" light trap funnel into a large number of smaller light trap funnel structures analogous to the Fresnel principle. By aligning these Fresnel light trap structures, the backscatter cross-section seen from the light emitter is reduced in comparison to the straight, regularly jagged light-absorbing structures. The basic pulse is considerably reduced.

In some embodiments, the (Fresnel) light trap structures have a Fresnel axis analogous to a focal point of a Fresnel step lens. They are also aligned with a common Fresnel point. The Fresnel point lies in a floor plane of the measurement chamber opposite the measurement chamber cover or at a short distance from it towards the measurement chamber cover, i.e. at a short distance of a maximum of 5 mm, or a maximum of 2 mm. The floor plane is the plane that is spanned by an edge of the measurement chamber in the sense of a "pot rim". The measurement chamber is designed in such a way that this edge then lies flat against a circuit carrier of the smoke detection unit or against a flat cover on the circuit carrier after the measurement chamber has been attached to or on the smoke detection unit provided. The floor plane thus runs parallel to the plane of the circuit carrier.

In some embodiments, the Fresnel light trap structures are aligned in such a way that the Fresnel point is located at the light exit of a light emitter of the smoke detection unit after the measurement chamber has been attached to a smoke detection unit provided. In other words, it is not absolutely necessary for the axis of rotation or rotational symmetry axis of a typical measurement chamber to coincide with the Fresnel axis.

In some embodiments, the Fresnel light trap structures can be designed or shaped in such a way that, after the attachment of the measurement chamber to a smoke detection unit provided, they are optically aligned with a straight line. The straight line runs at least approximately through an optical transmission axis at the light exit point of a light emitter of the smoke detection unit and preferably at least approximately through a receive axis of a photosensor of the smoke detection unit. This straight line lies in a floor plane of the measurement chamber opposite the measurement chamber cover or at a slight distance from the floor plane towards the measurement chamber cover.

As a result, the Fresnel light trap structures are not concentric to the Fresnel axis, but linearly straight and thus parallel to this straight line. Compared to the known straight, regular, jagged light-absorbing structures, this design of the Fresnel light trap structures also has a significantly reduced backscatter cross-section. This significantly reduces the basic pulse.

In some embodiments, these straight Fresnel structures of such a measurement chamber cover can also have what are known as undercuts. Such structures cannot be produced—apart from by a complex 3D plastic printing process—by means of a conventional injection molding process with a punch and die but by means of an extrusion process. Here, an extruded profile, in some cases made of a (black) plastic, with the straight, linear Fresnel structures is produced by means of an extrusion process and then the measurement chamber cover is cut out of this extruded profile, for example by means of a punching process. Finally, the measurement chamber cover is joined together with a complementary, essentially hollow or hollow cylindrical smoke inlet part or a labyrinth part to form the overall measurement chamber.

In some embodiments, the Fresnel light trap structures are characterized by a plurality of notches or grooves arranged concentrically to the Fresnel axis, for example in the range from 10 to 100, in particular in a range from 25 to 50, or by a (single) notch or groove running in a spiral shape in relation to the Fresnel axis, in the sense of a disk.

In some embodiments, the measurement chamber cover has a measurement chamber cover plane running parallel to the floor plane of the measurement chamber. The concentrically arranged notches or grooves, or the notch or groove running in a spiral shape, have a respective inner edge in the measurement chamber cover and a respective outer edge projecting away from the measurement chamber cover. A respective outer edge is offset radially outward in relation to a radially inwardly adjoining inner edge in such a way that a flank formed between the two edges runs orthogonally to the measurement chamber cover plane.

An "ideal" Fresnel light trap typically has undercuts in the radial outer area. An injection molding process for producing such Fresnel light trap structures—except for a complex 3D plastic printing process—is therefore out of the question for production reasons. By offsetting the inner edges radially outwards, it is now possible to produce a concentric "Fresnel light trap" by means of an injection molding process. In optical terms, this solution is not as good as the previous solution with the Fresnel light trap structures with undercuts, but it is still considerably better than the known straight, regularly jagged structures.

In some embodiments, the measurement chamber has an axis of rotation or axis of rotation symmetry running orthogonally to the floor plane. The Fresnel light trap structures are aligned in such a way that the Fresnel axis is parallel, e.g. at least approximately runs in alignment with the axis of rotation or with the axis of rotational symmetry of the measurement chamber. Due to the central arrangement of the light emitter and the photosensor adjoining it, the smoke detection unit advantageously has a largely direction-independent response to smoke in the radial direction to the Fresnel axis.

In some embodiments, the Fresnel light trap structures are aligned in such a way that the Fresnel axis is at least approximately in alignment with an optical transmission axis of the light emitter of the smoke detection unit. This embodiment may be used if—as for example with the smoke detection unit according to EP 3 499 475 A2 described at the beginning—the optical transmission axis of the light emitter does not run orthogonally to the circuit carrier, but rather obliquely to it and thus also obliquely through the measurement chamber cover of the measurement chamber. This "converging" arrangement of the concentric Fresnel light trap structures around the Fresnel axis enables a symmetrical alignment of the Fresnel light trap structures on the "obliquely" emitted light beam of the light emitter.

In some embodiments, the measurement chamber is in particular cylindrical in shape. The measurement chamber cover in this case follows a cylindrical basic surface.

In some embodiments, the measurement chamber has lamellae that are permeable to smoke and shield against direct ambient light. The lamellae run along the circumference of the measurement chamber.

In some embodiments, the measurement chamber has an internal diameter in a range from 25 mm to 80 mm, or in the range from 25 mm to 50 mm. In some embodiments, it has a measurement chamber height in a range from 10 mm to 40 mm, e.g. in the range from 15 mm to 25 mm. In some embodiments, the Fresnel light trap structures have a structure depth in a range from 1 mm to 10 mm, or in a range from 1.5 mm to 5 mm, or in a range from 2 mm to 3 mm. "Structure depth" means the axial dimensions of the light-absorbing, angular, e.g. sharp-edged structures in relation to the Fresnel axis. In some embodiments, the measurement chamber cover of the measurement chamber has a uniform measurement chamber thickness that is greater than the structure depth in a range from 1 mm to 3 mm.

The measurement chamber cover may be produced by an injection molding process, in particular by means of a plastic injection molding process, as a spherical component with introduced angular concentric light trap structures. The light trap structures are shaped in such a way that, as Fresnel light trap structures, they follow the compact-design principle of a Fresnel stepped lens. Typically, the Fresnel light trap structures are then aligned with a distant Fresnel point on a Fresnel axis of the measurement chamber cover. "Distant" here means that this distant Fresnel point is at least 30 mm away from the measurement chamber cover.

After completion of the injection molding process, the Fresnel light trap structures of the spherical measurement chamber cover are free of undercuts. The spherical measurement chamber cover is then shaped into an essentially flat measurement chamber cover by means of a forming process. Here will be the Fresnel light trap structures shaped towards the Fresnel axis. The Fresnel light trap structures now form undercuts. Typically, the remote Fresnel point also shifts on the Fresnel axis to a Fresnel point in a floor plane of the measurement chamber or at a short distance therefrom. The Fresnel point is thus located after the overall measurement chamber has been produced and after it has been attached to a smoke detection unit provided, at least approximately at the light exit of a light emitter of the smoke detection unit. After the measurement chamber has been attached to the smoke detection unit provided, the Fresnel point is located in a floor plane of the measurement chamber or at a short distance from it. "Short distance" means a distance of a maximum of 5 mm, or a maximum of 2 mm.

The geometric construction of the Fresnel light trap structures in the case of a spherical measurement chamber cover can be determined for example by means of a finite element process, so that the ideal Fresnel light trap structure with the desired undercuts results after the shaping process. For example, a measurement chamber cover with Fresnel light trap structures with undercuts that are "ideal" for the intended measurement chamber can be "transformed" to a spherical surface with a decreasing radius until the measurement chamber cover is free of undercuts as from a reduced radius. In some embodiments, the forming process is a blow molding process.

In some embodiments, a smoke detection module comprises a smoke detection unit with at least one light emitter arranged on a circuit carrier and with at least one spectrally matched photosensor, in a scattered light arrangement in each case. The at least one light emitter and the at least one spectrally matched photosensor are directly opposite the measurement chamber cover of the measurement chamber. The scatter angle between the respective optical transmission and reception axes of the at least one light emitter and the at least one photosensor of the smoke detection unit is in particular in the range from 160° to 185°. Such a scattered light arrangement is also referred to as a backward scattered light arrangement.

The at least one light emitter and the at least one photosensor matched spectrally to it can also be an already integrated optoelectronic component, i.e. a so-called System-on-a-Chip (SoC), in particular a System-on-a-Chip designed as an SMD component.

Furthermore, the smoke detection module comprises a measurement chamber or a measurement chamber produced according to the method of production incorporating teachings of the present disclosure. The measurement chamber is attached to or above the smoke detection unit. The measurement chamber, together with the circuit carrier on which a bottom edge or a "pot edge" of the measurement chamber rests, encloses the at least one light emitter and the at least one photosensor. The circuit carrier can also have a flat plastic cover, e.g. with screens for the at least one light emitter and/or photosensor, under a spatial recess of the at least one light emitter and the at least one photosensor.

In some embodiments, the measurement chamber has an axis of rotation or a rotational symmetry axis, the measurement chamber being positioned on the circuit carrier in such a way that the axis of rotation or the axis of rotational symmetry of the measurement chamber or the Fresnel axis of the Fresnel light trap structures is aligned at least approximately with an optical structure of the transmission axis of the light emitter of the smoke detection unit. Due to the central arrangement of the at least one light emitter and the at least one photosensor adjoining it, the smoke detection module advantageously has a largely non-directional response behavior to smoke in a direction radial to the Fresnel axis.

In general, "at least approximately" in relation to the alignment of the Fresnel axis or rotational or rotational symmetry axis to the light emitter or to the light exit point of the light emitter means a permissible deviation of a few millimeters, in particular less than 5 mm.

If reference is generally made to the alignment of a light emitter or the light exit of a light emitter, in the case of two light emitters an alignment to one of the two light emitters or to the light exit point of one of the two light emitters, or an alignment to a point geometrically between the two light emitters or between the two light exit points between the two light emitters is meant.

In some embodiments, the at least one light emitter is optically followed by a screen to limit the respective emitted light beam. There is at least one photosensor optically upstream of a further diaphragm to limit the respective optical reception area. The optical limits are dimensioned such that only a portion of the area of the part of the measurement chamber cover illuminated by the respective light emitter lies in a range of 10% to 40%, e.g. in a range of 10 to 20%, in the respective optical detection range of the at least one photosensor. This reduces the influence of the illuminated area on the basic signal.

In some embodiments, a scattered light smoke detector has a detector housing and a smoke detection module accommodated in the detector housing. The detector housing has one or more smoke inlet openings for the passage of ambient air into the interior of the detector housing and further into the measurement chamber of the smoke detection module.

In some embodiments, a scattered light smoke detector has a detector housing and a smoke detection module accommodated in the detector housing. The measurement chamber of the smoke detection module is an integral part of the detector housing. The detector housing has one or more smoke inlet openings embodied as lamellae, permeable to smoke to be detected and shielding from direct ambient light.

In some embodiments, the smoke detectors or scattered light smoke detectors under consideration are smoke gas detectors or smoke alarm devices. They can also have a gas sensor for detecting gases typical of fires and/or a temperature sensor. Furthermore, the smoke alarms under consideration can be connected to a fire alarm center via a common alarm line or alarm line, in particular a two-wire line, for signaling and/or data purposes. In some embodiments, they can have an autonomous energy supply, such as a battery. Furthermore, such smoke alarms can have a radio module for transmitting an alarm message, a warning message or status information to a neighboring smoke alarm or to a fire alarm center.

Figure 1:
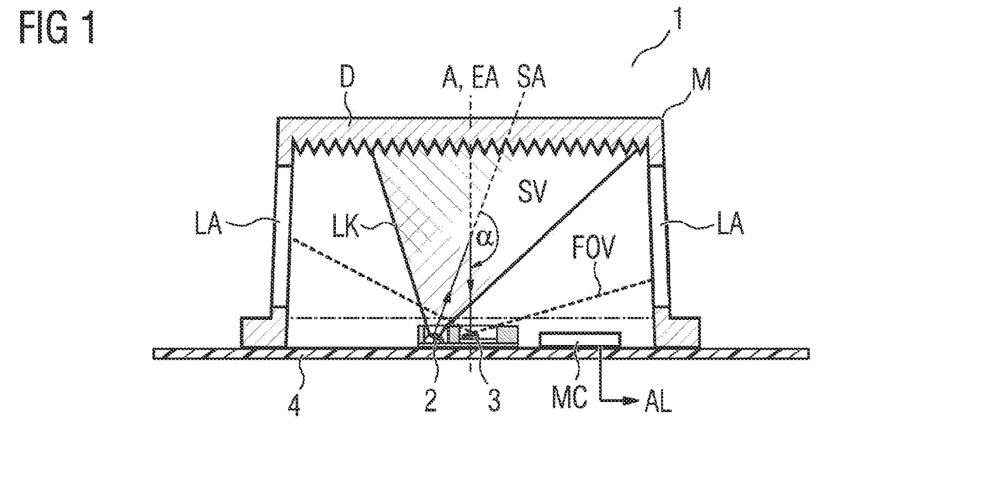
FIG. 1 shows a sectional view through a smoke detection module according to the prior art.

FIG. 1 shows a sectional view through a smoke detection module 1 according to the prior art. A trough-shaped or cup-shaped measurement chamber, which is closed off by a circuit carrier 4, is denoted by M. LA are radially outer lamellae radial to an axis of rotation or axis of rotational symmetry A of the measurement chamber M that shield the interior of the measurement chamber M from direct ambient light. An optoelectronic SMD component SoC is already arranged on the circuit carrier 4 as an integrated unit, i.e. as a so-called System-on-a-Chip (SoC), which comprises a light-emitting diode as light emitter 2 and a photodiode as photosensor 3. A microcontroller MC is connected to this "chip" SoC, which is set up to control the LED to emit light pulses and to receive and evaluate a sensor signal from photosensor 3 and, if necessary, to output a fire alarm AL.

LK denotes a beam of light emitted by the light-emitting diode 2 and SA denotes the associated optical transmission axis. The optical detection range of the photosensor 3 is designated with FOV. In the present example, the optical reception axis of the photosensor 3 is aligned with the axis of symmetry A of the measurement chamber M. The transmission axis SA is slightly inclined to the optical reception axis, so that a larger scattered light volume SV results as a geometric intersection volume from the light beam LK and the optical detection area FOV. The scatter angle between the optical transmission and reception axes SA, A is denoted by α. It is around 160° here. Such a scattered light arrangement is also referred to as a backward scattered light arrangement.

In comparison to other known scattered light arrangements in which the optical axes SA, EA of the light emitter 2 and photosensor 3 run parallel to the plane of the circuit carrier 4, the measurement chamber cover D is, so to speak, "fully" illuminated. In order to suppress the directly incident light from the light emitter 2 as much as possible, the inside of the measurement chamber cover D directly opposite the light emitter 2 and the photosensor 3 has light-absorbing structures AB in the form of small, jagged light traps. In this arrangement, however, part of the light emitted by the light emitter 2 is disadvantageously scattered back to the photosensor 3, the light level of which is many times higher than the alarm level in the presence of an impermissibly high concentration of smoke in the measurement chamber M. Reliable smoke detection is thus not possible at all.

Figure 2:
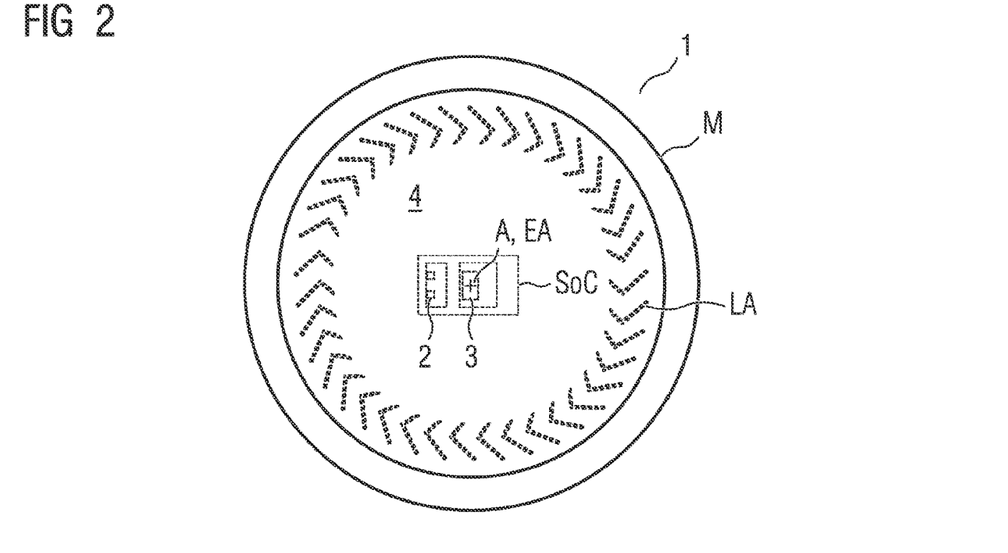
FIG. 2 shows a plan view of the smoke detection module according to FIG. 1.

FIG. 2 shows a plan view of the smoke detection module 1 according to FIG. 1. In this diagram, the structure of the integrated component SoC with the LED 2 and the photodiode 3 as well as the lamellae LA for shielding against ambient light can be clearly seen.

Figure 3:
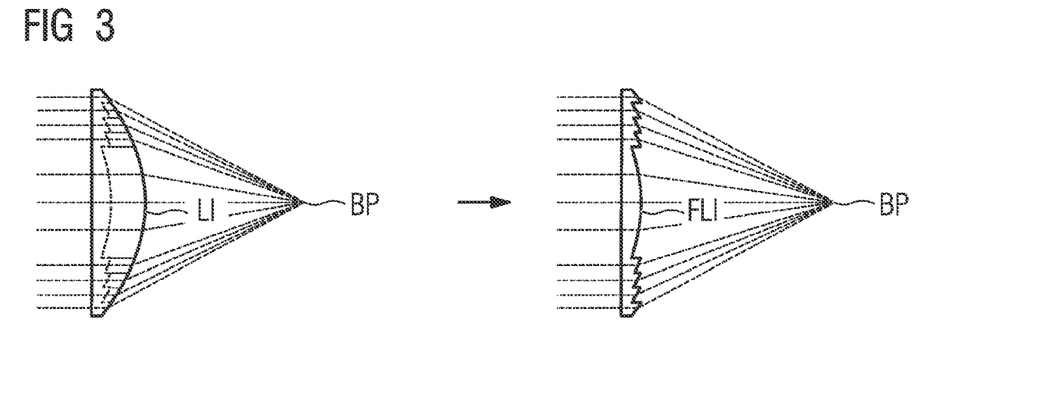
FIG. 3 shows the compact-design principle in an optical Fresnel stepped lens.

FIG. 3 shows the principle of compact design in the case of an optical Fresnel stepped lens FLI. In the left-hand part of FIG. 3, a plano-convex optical lens LI can be seen with its focal point BP. The stepped compact design is shown by dashed lines. In the right-hand part of FIG. 3, the Fresnel stepped lens FLI of compact design can be seen.

Figure 4:
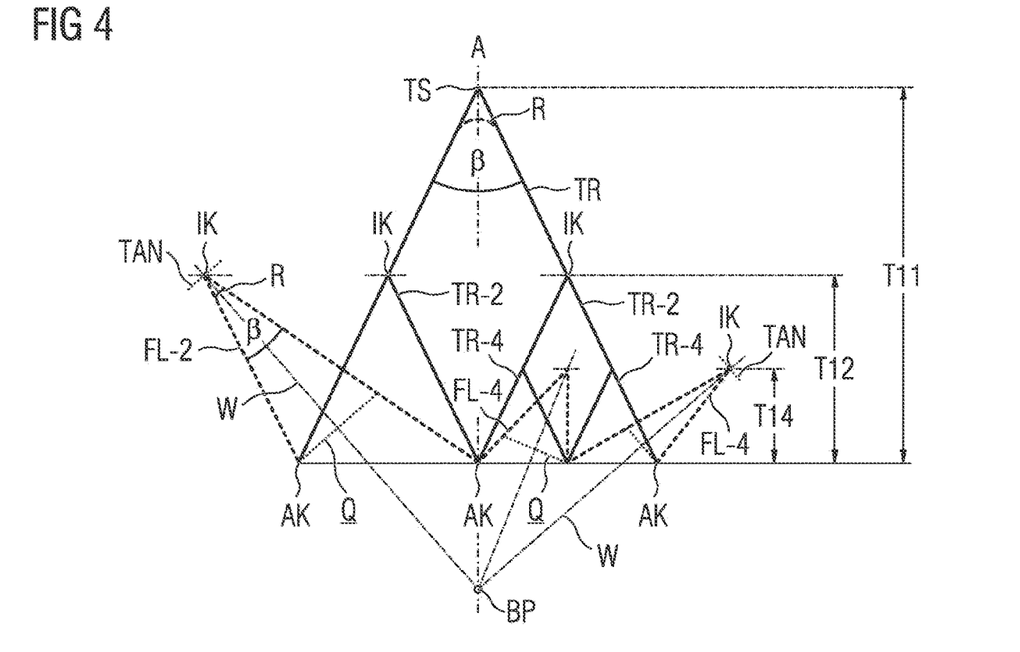
FIG. 4 shows the transfer of the principle according to FIG. 3 to a light trap funnel incorporating teachings of the present disclosure.
Figure 5:
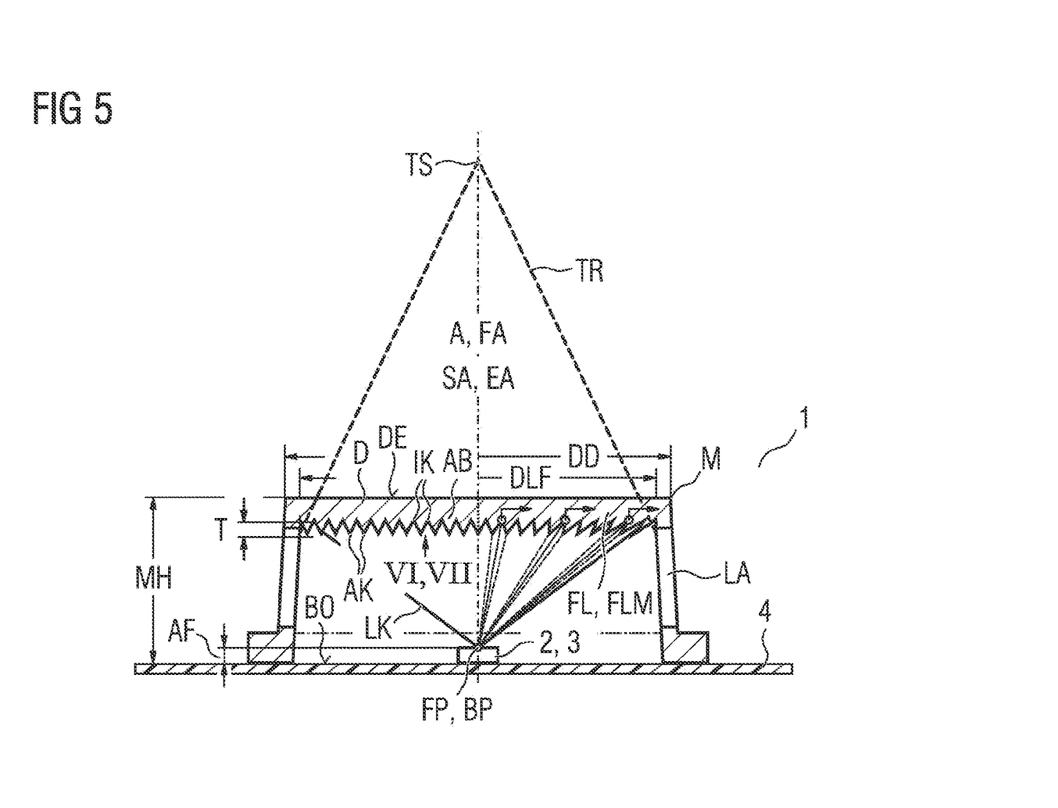
FIG. 5 shows a section through an example of a measurement chamber with known straight, uniformly jagged light-absorbing structures and with inventive Fresnel light trap structures in a joint diagram incorporating teachings of the present disclosure.

FIG. 4 shows the transfer of the principle according to FIG. 3 to a light trap funnel TR incorporating teachings of the present disclosure. According to the image plane shown, incident light rays from a light emitter 2, i.e. from bottom to top or from bottom to diagonally above, would "run out" here after a large number of reflections. TS refers to a funnel tip, which is directed onto a focal point BP corresponding one of the optical Fresnel stepped lens FLI. The angle β denotes the opening angle of the light trap funnel TR. The reference character R denotes a rounded portion that the light trap funnel TR can have as an alternative to the funnel tip TS. Such a shape is also well suited as a light trap. The alignment of the light trap funnel TR is carried out, for example, along the symmetry axis A of the light trap funnel TR. The depth of the light trap funnel TR is designated by T11. The following figure, FIG. 5, shows how the light trap funnel TR would initially be placed as an "ideal" light trap instead of the measurement chamber cover D there. To achieve concentric Fresnel light trap structures FS, as a starting point a cone serves as a light trap funnel TR.

To achieve linear, straight Fresnel light trap structures FS, a "gable roof" serves as the starting point. In FIG. 4 it can be seen how the light trap funnel TR is initially divided into two adjacent, for example similar, sub-funnels TR-2. The structural depth T12 of the two sub-funnels TR-2 has been halved.

The left-hand part of FIG. 4 shows how the funnel tip of the left-hand sub-funnel TR-2 is now displaced radially outward with respect to the axis of symmetry A, so that the funnel tip of the current part Fresnel light trap LF-2 and thus its inner edge IK is optically aligned with the "focal point" BP of the light trap funnel TR. Q is the light trap cross-section seen from the "focal point". The bisector to the opening angle β of the part Fresnel light trap LF-2 is designated with W, which for illustration is perpendicular here to the tangent denoted by TAN. The tangent TAN actually runs perpendicular to the plane of the drawing in FIG. 4 and lies against the inner edge IK of the partial Fresnel light trap LF-2.

The right-hand part of FIG. 4 shows a further halving, so that a total of four sub-funnels TR-4 result. Their depth T14 is only a quarter of the depth T11 of the original light trap funnel TR. In some embodiments, the funnel tips of the two right-hand sub-funnels TR-4 are now set radially outwards with respect to the axis of symmetry A, so that the funnel tip of the current part Fresnel Light traps LF-4 and thus their inner edge IK, in turn, are optically aligned with the "focal point" BP of the light trap funnel TR.

In the example shown in FIG. 4, the halving has taken place uniformly and is only to be considered as an example. It is also possible to divide the original light trap funnel TR into thirds or any other kind of division. The respective structure depths T12, T14 can also differ from one another. The only decisive factor is that a plurality of arbitrary sub-funnels with arbitrary structural depths are arranged next to one another, which are optically aligned with the "focal point". The arrangement shown with the optical alignment along the respective bisector to the "focal point" is particularly effective as a light trap.

FIG. 5 shows a section through an exemplary measurement chamber M with known straight, uniformly jagged light-absorbing structures AB and with Fresnel light trap structures FL, FLM in a joint diagram. It is shown how the "ideal", but space-consuming light trap funnel TR would be placed as an "ideal" light trap instead of the measurement chamber cover D shown. MH denotes a total height of the measurement chamber M and T denotes a structure depth of the light-absorbing structures AB and the Fresnel light trap structures FL, FLM, which is the same here by way of example. DD denotes the diameter of the measurement chamber cover D and DLF the diameter of the Fresnel light trap structures FL, FLM shown.

In the left-hand part of FIG. 5, known triangular jagged light trap structures AB can be seen. These structures, the further they are located radially away from the axis of symmetry A, are increasingly less directed towards the light transmitter 2. The backscatter cross-section disadvantageously increases steadily.

In the right-hand part of FIG. 5, starting from the triangular light trap structure AB, it can be seen how the inner edges IK of the respective light trap structures—symbolized by direction arrows—are now optically aligned by the radial outward displacement with a Fresnel point FP on the light emitter 2. In some embodiments, the Fresnel point FP is at a distance AF from the floor plane BO at the light exit point of the light emitter 2. The floor plane BO of the measurement chamber M shown runs parallel to a measurement chamber cover plane DE at a distance of the entire measurement chamber height MH.

Figure 6:
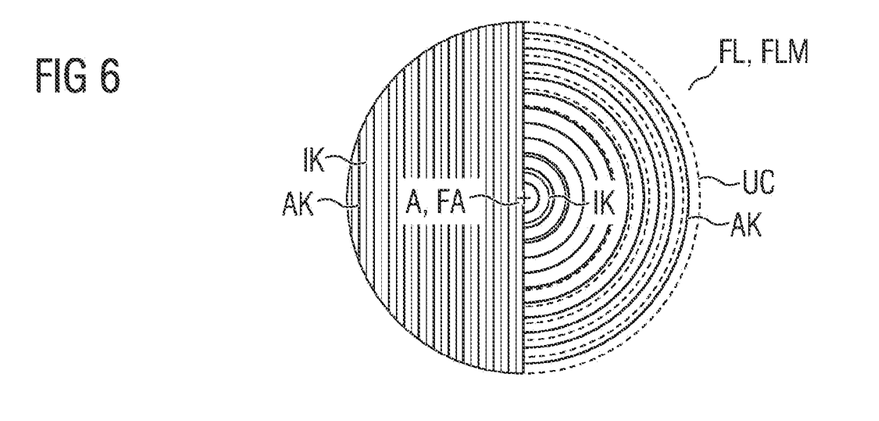
FIG. 6 shows a view of the measurement chamber cover according to the direction of view VI shown in FIG. 5 with the known straight, evenly jagged structures and with concentric Fresnel light trap structures with undercuts incorporating teachings of the present disclosure.

FIG. 6 shows a view of the measurement chamber cover D according to the viewing direction VI depicted in FIG. 5 with the known straight, uniformly jagged structures AB in the left-hand part of FIG. 6 and in a comparison with concentric Fresnel light trap structures FLM with undercuts UC in the right-hand part of FIG. 6. The undercut conditions UC themselves are shown by dashed lines. These are concealed along the viewing direction VI and thus also from the view of the light emitter 2 and are therefore not visible. As described at the beginning, such a measurement chamber cover D with this type of undercuts UC cannot be produced by means of a conventional injection molding process.

Figure 7:
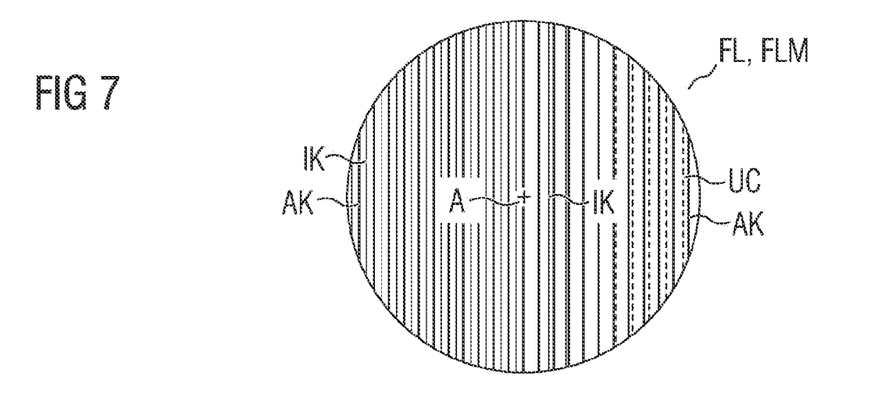
FIG. 7 shows a view of the measurement chamber cover according to the direction of view VII depicted in FIG. 5 with the known structures and with linearly straight Fresnel light trap structures with undercuts incorporating teachings of the present disclosure.

FIG. 7 shows a view of the measurement chamber cover D according to the direction of view VII depicted in FIG. 5 with the structures AB known in their turn in the left-hand part of FIG. 7 and with now linearly straight Fresnel light trap structures FLM with undercuts UC. A measurement chamber cover D with such Fresnel light trap structures FLM can be produced by means of an extrusion process.

Figure 8:
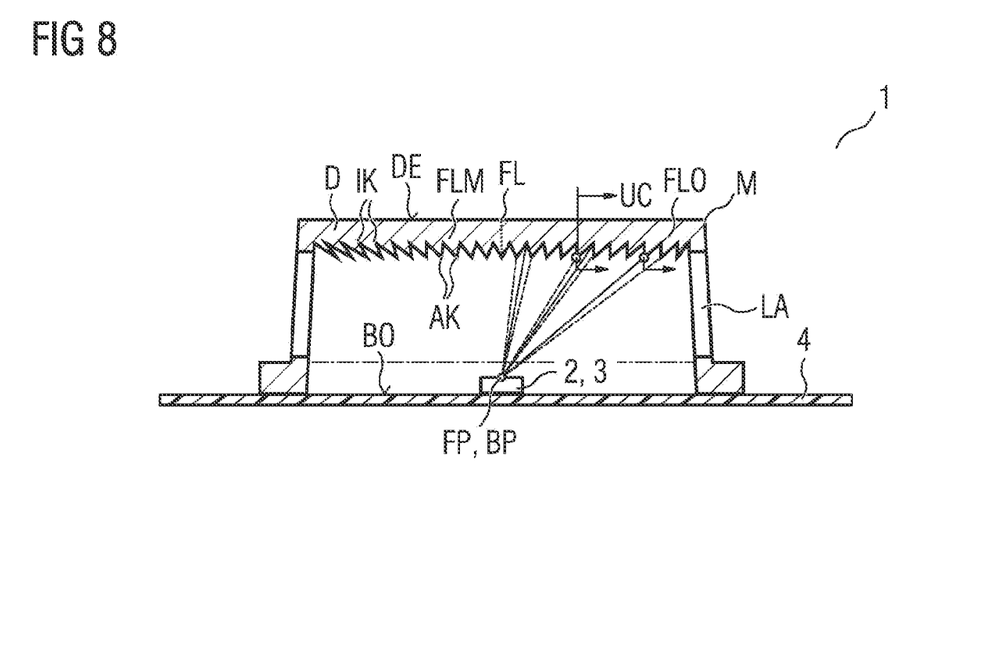
FIG. 8 shows a section through an exemplary measurement chamber with the concentric Fresnel light trap structures with undercuts and with further concentric Fresnel light trap structures without undercuts, each incorporating teachings of the present disclosure.

FIG. 8 shows a section through an example of a measurement chamber M with the concentric Fresnel light trap structures FLM with undercuts UC and with further concentric Fresnel light trap structures FLO without undercuts. In this example it can be seen how the Fresnel light trap structures FLM with undercuts UC in the left-hand part of FIG. 8, by moving the outer edges AK radially outwards, are now converted into Fresnel light trap structures FLO without undercuts in the right-hand part of FIG. 8.

Figure 9:
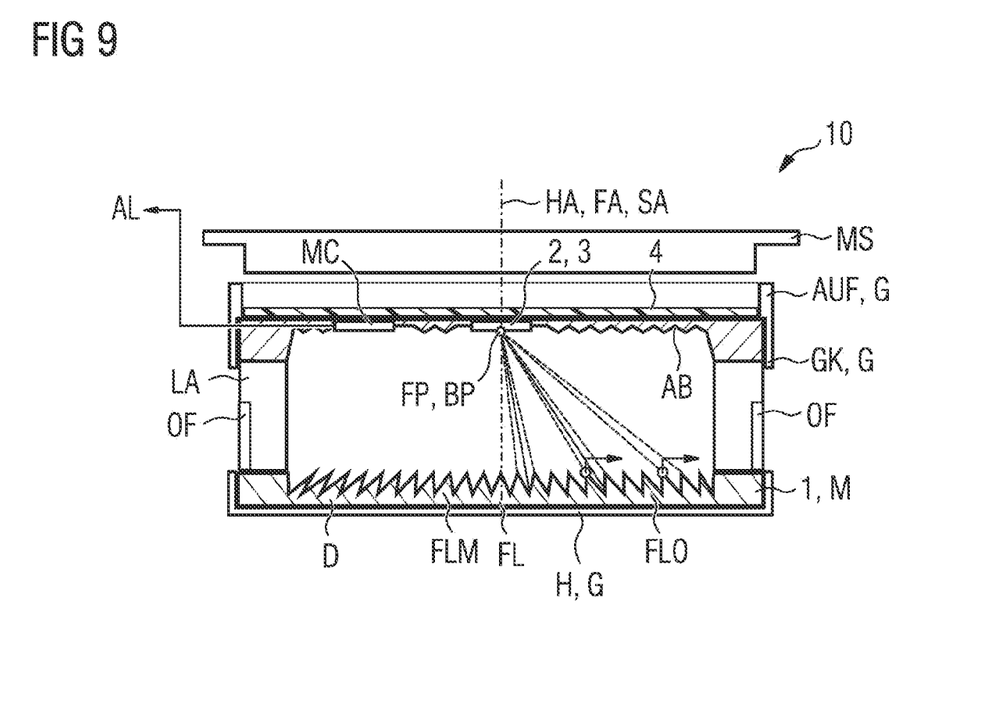
FIG. 9 shows a section through a scattered light smoke detector with a detector housing and with a smoke detection module incorporating teachings of the present disclosure.

FIG. 9 shows a section through a scattered light smoke detector designed as a smoke detector. The scattered light smoke detector 10 comprises a detector housing G and a smoke detection module 1 accommodated in the detector housing G. The measurement chamber M can be attached as a separate part within the detector housing G on or above the smoke detection unit 1 of the smoke detection module 1. In this case the smoke to be detected passes through one or more smoke inlet openings OF which are present or formed in the detector housing G and onwards through the lamellae LA of the measurement chamber M to the smoke detection unit 1 inside the measurement chamber M.

In the case shown, the measurement chamber M of the smoke detection module 1 is an integral part of the detector housing G itself. The detector housing G has one or more smoke inlet openings OF designed as lamellae LA, permeable for smoke to be detected and shielding from direct ambient light. For a better understanding, the measurement chamber M shown again shows the concentric Fresnel light trap structures FLM with undercuts UC and the concentric Fresnel light trap structures FLO without undercuts in a single illustration, analogous to the illustration in FIG. 8.

The detector housing G can also have further housing parts, such as a detector hood H or a receptacle AUF for at least detachable attachment of the smoke detector 10 to a detector base MS. The detector housing G can be composed of a base body GK and the detector hood H. In between, the measurement chamber M is then molded or shaped as part of the detector housing G. The part of the circuit board 4 of the smoke detector opposite the measurement chamber cover D of the smoke detection module 1 or the smoke alarm 10 itself can be covered with additional light-absorbing structures AB.

HA denotes a main axis of the substantially symmetrical or rotationally symmetrical detector housing G. In particular, this main axis HA, the Fresnel axis FA of the measurement chamber M and the transmission axis SA of the light emitter 2 of the smoke detection unit are aligned with one another. As a result, a largely direction-independent response of the smoke detector 10 to smoke to be detected is achieved.

Figure 10:
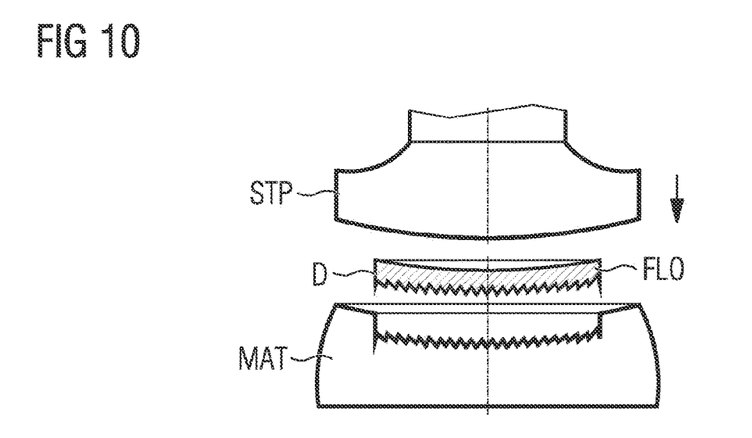
FIG. 10 shows an exemplary injection molding process as the first stage of a production process for a measurement chamber cover for a measurement chamber incorporating teachings of the present disclosure.

FIG. 10 shows an example of an injection molding process as the first stage of a production process for a measurement chamber cover D for a measurement chamber M. A punch tool STP can be seen in the upper part of FIG. 10 and a die MAT in the lower part. In between, the spherical measurement chamber cover D produced after the first stage can be seen as an intermediate product. Because of the linear injection molding process used, the latter has Fresnel light trap structures FLO without undercuts.

Figure 11:
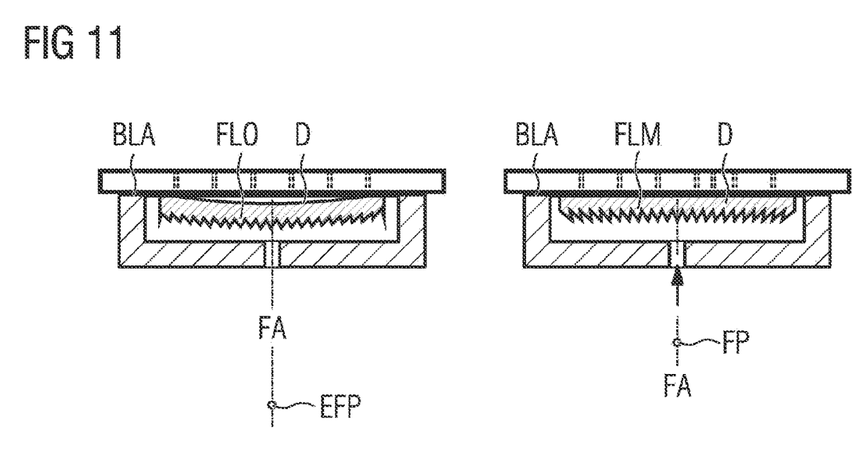
FIG. 11 shows an exemplary deformation method as the second stage of the production method for the measurement chamber cover for a measurement chamber incorporating teachings of the present disclosure.

FIG. 11 shows an example of a forming process as the second stage of the production process for the measurement chamber cover D for a measurement chamber. BLA denotes a blow molding tool, by means of which the spherical measurement chamber cover D located therein is reshaped from the spherical shape into the flat final shape, e.g. by forcing in air. In the blow molding tool BLA venting channels are shown by dashed lines. This diagram also shows how a remote Fresnel point EFP is displaced by the deformation along the Fresnel axis FA in the direction of the measurement chamber cover D. The now flat measurement chamber cover D now has Fresnel light trap structures FLM with undercuts UC after the forming process.

Figure 12:
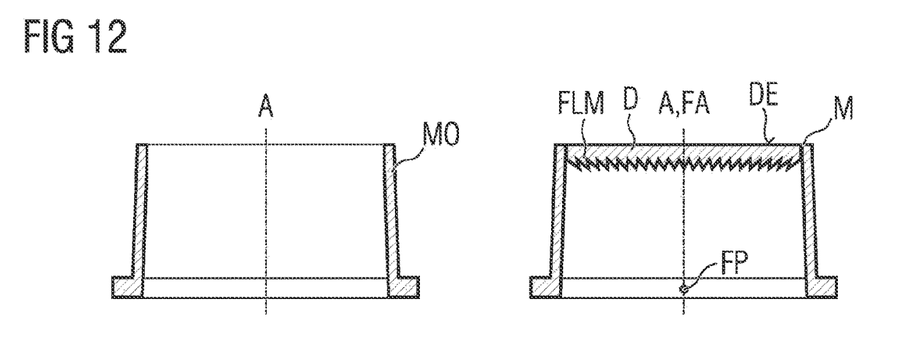
FIG. 12 shows an example of a joining process as the third stage of the production process for the overall measurement chamber incorporating teachings of the present disclosure.

FIG. 12 shows an example of a joining process as a third stage of the production process for the overall measurement chamber M. MO denotes the smoke inlet part of the measurement chamber M, into which the measurement chamber cover D from FIG. 11 is inserted by means of a joining process and then assembled to form the overall measurement chamber M. The joining can take place for example by means of gluing, ultrasonic welding, by means of a locking pin or by similar methods.

LIST OF REFERENCE CHARACTERS

1 Smoke detection module
2 Light emitter, light emitting diode
3 Photosensor, photodiode
4 Circuit carrier, printed circuit board
10 Fire alarm, smoke alarm
α Scattering angle
β Opening angle
A Axis of symmetry, rotational symmetry axis
AB Light-absorbing structures, light trap structures
AF Distance from floor, distance of the Fresnel point
AK External edges of the light trap structure
AL Fire alarm
AUF Receptacle
BLA Stretch blow molding tool, blow molding tool
BO Measurement chamber floor, plane of the measurement chamber floor
BP Focal point
D Measurement chamber cover
DD Diameter of the measurement chamber cover
DE Measurement chamber cover plane
DLF Diameter of the Fresnel light trap structure
EA Optical receiving axis
EFP Distant Fresnel point
FA Fresnel axis
FL Fresnel light trap structure
FL-2, FL-4 Part Fresnel light traps
FLI Fresnel lens
FLM Fresnel light trap with undercuts
FLO Fresnel light trap without undercuts
FOV Optical detection area, field-of-view
FP Fresnel point
G Detector housing
GK Base body
H Detector hood
HA Vertical axis
IK Inner edges of the light trap structure
LA Lamellae, labyrinth
LI Optical lens, plano-convex lens
LK Beam of light, bundle of light
M Measurement chamber, measurement chamber with labyrinth
MAT Die
MC Control unit, microcontroller
MH Measurement chamber height
MO Measurement chamber without installed measurement chamber cover, smoke inlet part, labyrinth part
MS Detector base
OF Smoke inlet opening
Q Light trap cross-section
R Rounding, radius
SA Optical transmission axis
SoC System-on-a-Chip, integrated unit
STP Stamp tool
SV Measurement volume, scatter volume
T Depth of the Fresnel light trap structure
T11 Depth of the light trap funnel
T12, T14 Depth of a sub-funnel
TAN Tangent
TR Light trap funnel, funnel
TR-2, TR-4 Sub-funnel
TS Funnel tip
UC Undercut
W Bisector

What is claimed is:

1. A method for producing a cylindrical measurement chamber for a smoke detection unit of a smoke detector, the method comprising:
    forming a measurement chamber cover using an injection molding process;
    combining the measurement chamber cover with a complementary, essentially hollow or hollow cylindrical smoke inlet part to make up the measurement chamber;
    wherein the measurement chamber cover comprises a spherical component with introduced angular concentric light trap structures shaped to form Fresnel light trap structures following the compact-design principle of a Fresnel stepped lens;
    wherein the Fresnel light trap structures of the spherical measurement chamber cover, after the injection molding process, are free of undercuts;
    wherein the spherical measurement chamber cover is formed into an essentially flat measurement chamber cover using a deformation process;
    wherein the Fresnel light trap structures are shaped in the direction of the Fresnel axis and undercuts form;
    wherein a Fresnel point, after the measurement chamber as a whole has been produced and after it has been attached to a smoke detection unit provided, is located at a light exit of a light emitter of the smoke detection unit.

2. A smoke detection module comprising:
    a light emitter arranged on a circuit carrier;
    a spectrally matched photosensor in a scattered light arrangement; and
    a measurement chamber attached to the smoke detection unit;
    the measurement chamber comprising:
    at least a passage for smoke to be detected;
    a measurement chamber cover with angular light trap structures on an inside of the measurement chamber, wherein the angular light trap structures are shaped to follow the compact-design principle of a Fresnel stepped lens;
    a diaphragm to limit the respective emitted light beam located optically downstream of the light emitter; and
    a further diaphragm to limit the respective optical reception area connected optically upstream of the photosensor;
    wherein the optical limits are dimensioned in such a way that only a proportion of the area of the part of the measurement chamber cover illuminated by the respective light emitter is in a range of 10% to 40% in the respective optical detection range of the at least one photosensor.

3. The smoke detection module as claimed in claim 2, wherein:

the light trap structures have a Fresnel axis and are aligned on a common Fresnel point; and the Fresnel point lies in a floor plane of the measurement chamber opposite the measurement chamber cover or at a small distance from the measurement chamber cover.

4. The smoke detection module as claimed in claim 3, wherein the Fresnel Light trap structures are aligned so the Fresnel point, after the measurement chamber has been attached to a smoke detection unit, is located at least approximately at a light exit of a light emitter of the smoke detection unit.

5. The smoke detection module as claimed in claim 4, wherein the Fresnel light trap structures are formed by a plurality of notches or grooves arranged concentrically to the Fresnel axis, or by a notch or groove running helically in relation to the Fresnel axis.

6. The smoke detection module as claimed in claim 5, wherein:
the measurement chamber cover has a measurement chamber cover plane running parallel to the floor plane of the measurement chamber;
the concentrically arranged notches or grooves, or the spiral-shaped notch or groove in the measurement chamber cover have a respective inner edge and a respective outer edge projecting away from the measurement chamber cover; and
a respective outer edge in relation to a radially inwardly adjoining inner edge is offset radially in such a way to the outside that a flank formed between the two edges runs orthogonally to the measurement chamber cover plane.

7. The smoke detection module as claimed in claim 3, wherein:
the measurement chamber has an axis of rotation or rotational symmetry axis running orthogonally to the ground plane; and
the Fresnel light trap structures are aligned in such a way that the Fresnel axis runs parallel to the axis of rotation or rotational symmetry axis of the measurement chamber.

8. The smoke detection module as claimed in claim 4, wherein the Fresnel light trap structures are aligned so the Fresnel axis aligns at least approximately with an optical transmission axis of the light emitter of the smoke detection unit.

9. The smoke detection module as claimed in claim 2, wherein:
the Fresnel light trap structures are linear, straight light trap structures and are shaped so, after the measurement chamber has been attached to a smoke detection unit, they are optically aligned with a straight line which is at least approximately through an optical transmission axis at a light exit point of a light emitter of the smoke detection unit; and
the straight line in a floor plane lies opposite to the measurement chamber cover of the measurement chamber or at a short distance from the floor plane towards the measurement chamber cover.

10. The smoke detection module as claimed in claim 2, wherein the measurement chamber has lamellae permeable to smoke and shielding from direct ambient light; and
the lamellae are arranged along the circumference of the measurement chamber.

11. The smoke detection module as claimed in claim 2, wherein the Fresnel light trap structures have a structure depth in a range from 1 mm to 10 mm.

12. The smoke detection module as claimed in claim 2, wherein:
the measurement chamber has an axis of rotation or a rotational symmetry axis;
the measurement chamber is positioned on the circuit carrier such that the rotational or rotational symmetry axis of the measurement chamber, or the Fresnel axis of the Fresnel light trap structures is at least approximately aligned with an optical transmission axis of the light emitter.

* * * * *